Nov. 18, 1947.  F. C. BURT  2,430,906
TRAILER FRONT WHEEL AND STEERING DEVICE
Filed Aug. 22, 1945  4 Sheets-Sheet 1
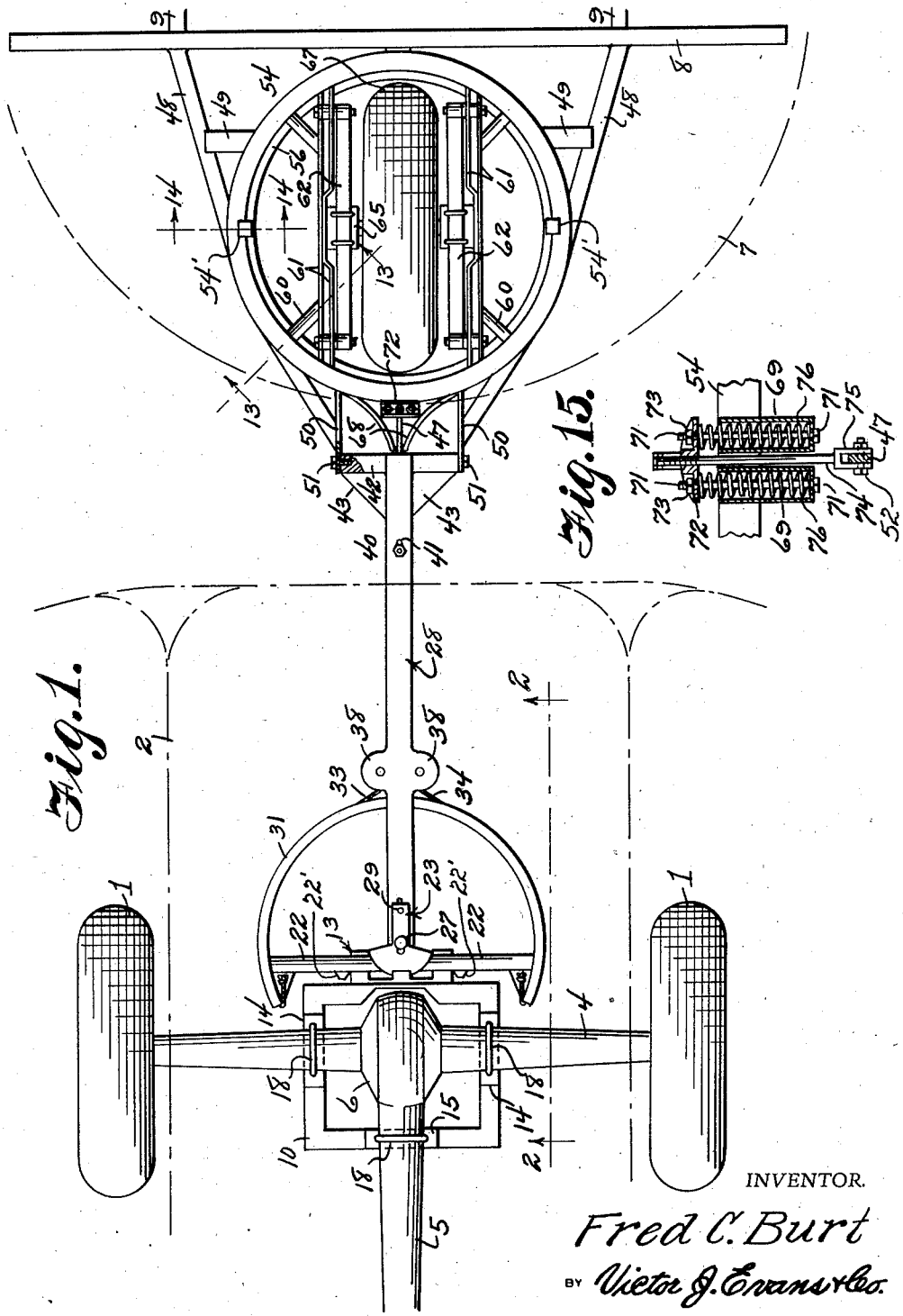
INVENTOR.
Fred C. Burt
BY Victor J. Evans & Co.
ATTORNEYS Nov. 18, 1947.  F. C. BURT  2,430,906
TRAILER FRONT WHEEL AND STEERING DEVICE
Filed Aug. 22, 1945  4 Sheets-Sheet 2
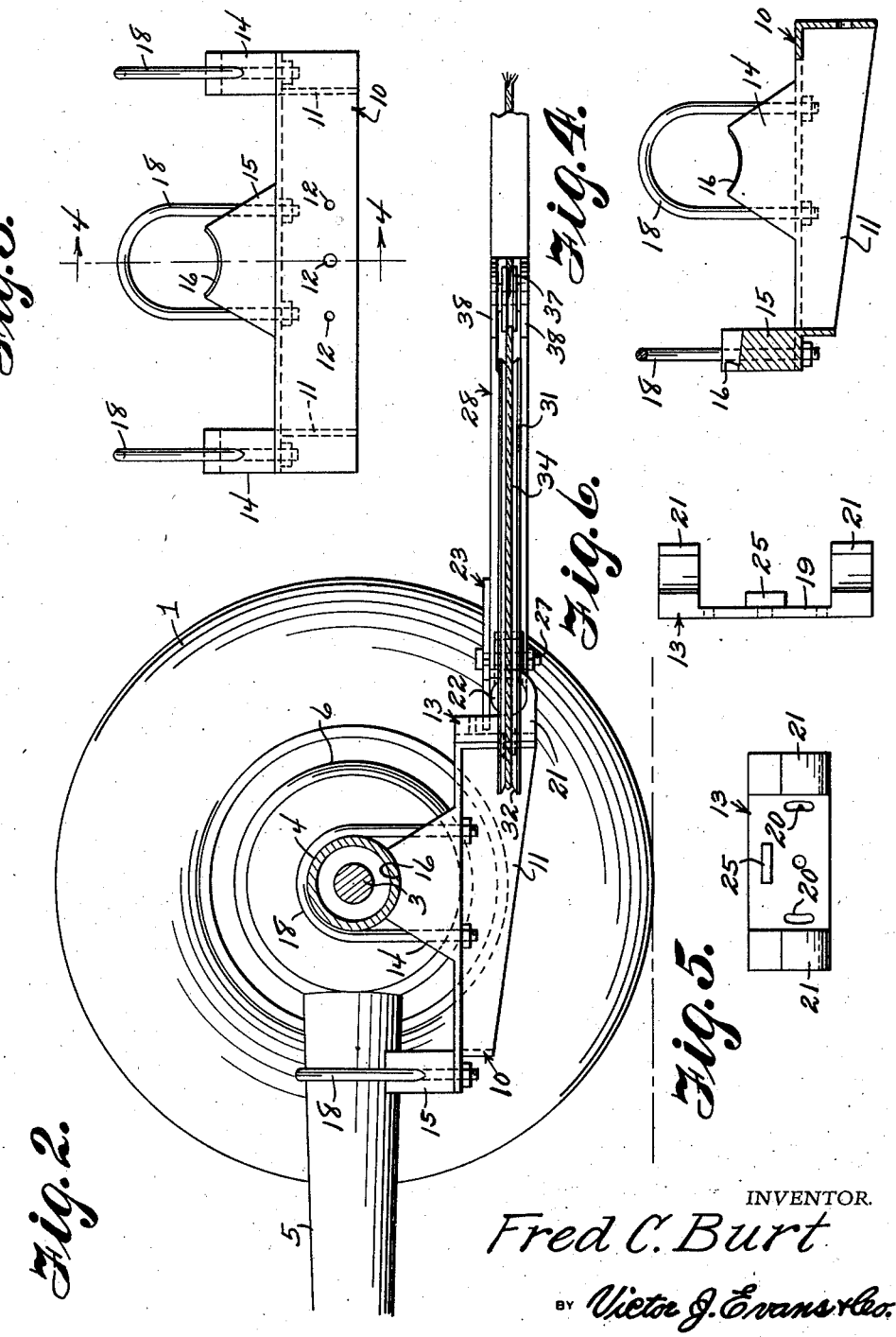
INVENTOR.
Fred C. Burt
BY
ATTORNEYS Nov. 18, 1947.  F. C. BURT  2,430,906
TRAILER FRONT WHEEL AND STEERING DEVICE
Filed Aug. 22, 1945  4 Sheets-Sheet 3
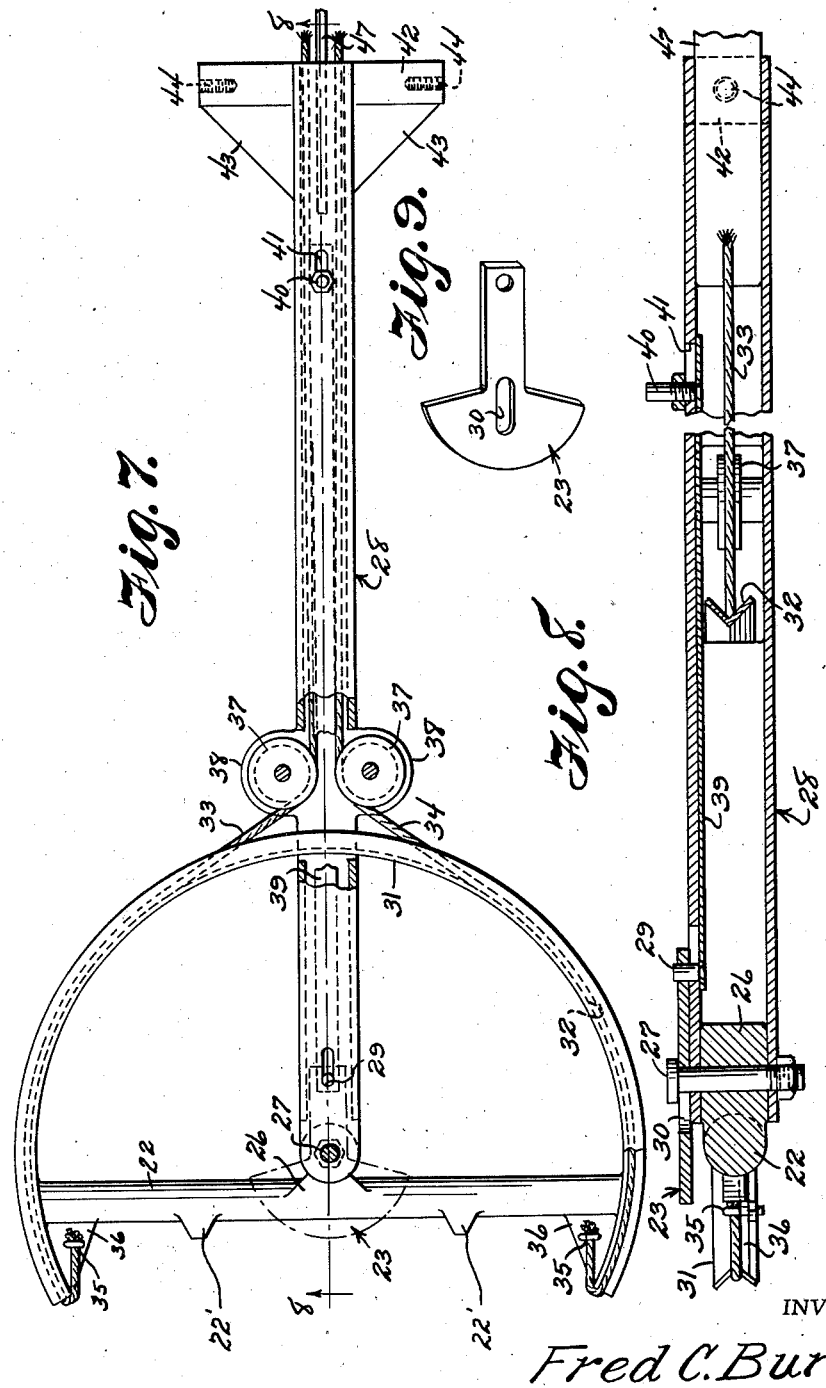
INVENTOR.
Fred C. Burt
BY Victor J. Evans & Co.
ATTORNEYS

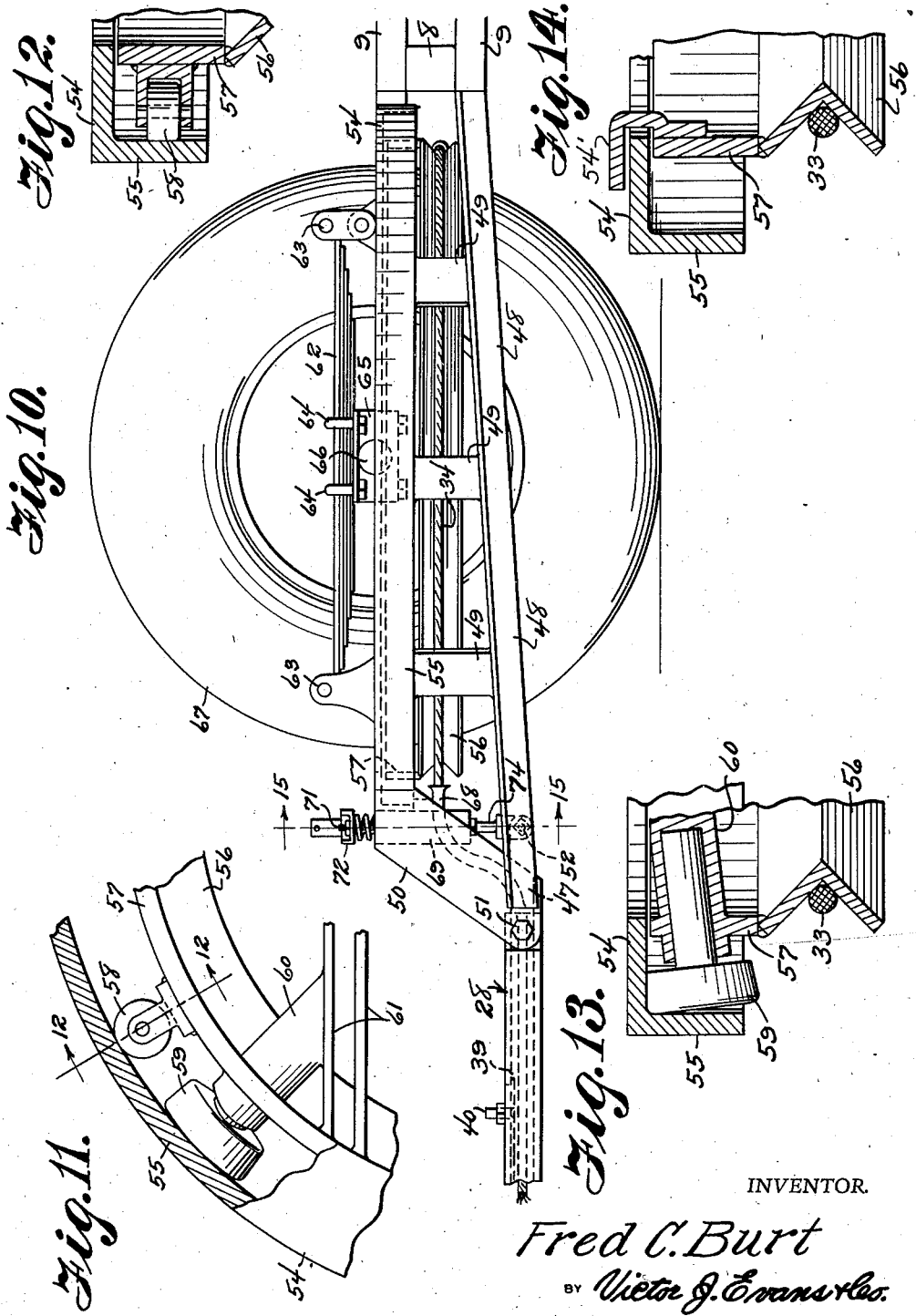

Patented Nov. 18, 1947

2,430,906

UNITED STATES PATENT OFFICE 2,430,906

TRAILER FRONT WHEEL AND STEERING DEVICE

Fred C. Burt, New Hudson, Mich.

Application August 22, 1945, Serial No. 612,021

8 Claims. (Cl. 280—33.5)

My present invention, in its broad aspect, has reference to improvements in trailer front wheels and supports, means for steering the same, and means for resiliently mounting the same and adjusting the same. More particularly, it is my purpose to remove the weight exerted by a trailer of the usual type upon the towing vehicle and at the same time steer the trailer so that it will automatically follow the towing vehicle, and I also provide means whereby the tongue or draw bar can move up and down thus easing the shocks on the towing vehicle, and at the same time, there is provided a weight adjustment spring arrangement whereby any amount of weight transferred to the towing vehicle may be varied, which is an advantage where more traction is needed as when traversing slippery roads or where the trailer is unusually heavy. My present wheel and carrier supports the front end of the trailer, thereby relieving the towing vehicle, and it is not necessary to jack-up or lift the front end of the trailer in hooking to the towing vehicle, and the front wheel may be used to steer and assist in parking and supporting the trailer when it has been detached from the towing vehicle. The trailer has no elaborate hitch and the possibility of shimmy is greatly reduced if not completely eliminated. No helper springs are required on the towing vehicle; the steering arrangement has means for reducing friction to facilitate steering and to eliminate wear, and the front wheel is resiliently mounted and may be easily removed if desired, furthermore, the use of the front wheel enables setting the rear wheels further back on the trailer so that the trailer is steadied and may be built closer to the ground, and the trailer may be backed in the usual manner.

Other and equally important objects and advantages of my invention will be apparent from the following description and drawings, and it is pointed out that changes in form, size, shape, materials, and construction and arrangement of parts is permissible and within the purview of my broad inventive concept, and the scope of the appended claims.

In the drawings wherein I have illustrated a preferred form of my invention:

Figure 1 is a top plan view of my invention;

Figure 2 is a section on the line 2—2 of Figure 1;

Figure 3 is a detailed front end view of the support and shackles whereby my device is hitched to the rear axle and drive shaft housing of the towing vehicle;

Figure 4 is a section of the support and shackles shown in Figure 3 taken on the line 4—4 thereof;

Figure 5 is a front view of the bracket for attaching the transverse steering rod or bar to the support;

Figure 6 is a top plan view of the bracket for attaching the transverse steering bar or rod;

Figure 7 is a detailed plan view of the part of my device coupled with the towing vehicle and including the steering cables, the supporting radius therefor and the tongue;

Figure 8 is a section on the line 8—8 of Figure 7;

Figure 9 is a detail of the top plate thereof;

Figure 10 is a side elevation of the traction front wheel, support and steering mechanism;

Figure 11 is a section through the track and wheel supporting forms showing the thrust and the traction rollers;

Figure 12 is a section on the line 12—12 of Figure 11;

Figure 13 is a section on the line 13—13 of Figure 1;

Figure 14 is a section on the line 14—14 of Figure 1, and

Figure 15 is a detail view of the spring compensated means for adjusting the weight exerted by the trailer on the towing vehicle.

In the drawings wherein like characters of reference are used to designate like or similar parts throughout the several views:

The numeral 1 designates the rear wheels of a towing vehicle, indicated in dotted lines at 2. The numeral 3 designates the rear axle, 4 the rear axle casing, 5 the drive shaft housing, and 6 the transmission housing. The trailer is indicated in dotted lines at 7 and has a frame, including a transverse bar 8 and longitudinal bars 9.

A supporting plate 10—see Figures 3 and 4—has downwardly depending flanges 11, the forward flange being of less width than the rear flange, and is formed with three openings 12 to which the hitch bracket 13—see Figures 5 and 6—is attached by bolts or the like. The support carries side blocks 14 and a front end block 15, each of which has angular sides and an arcuate top 16. U-shaped shackles 18 are bolted through the blocks to the supporting plate; the forward shackle engaging over the drive shaft housing with the block 15 clamped therebeneath, and the side shackles engaging over the rear axle housing with the blocks 14 clamped therebeneath.

Each hitch bracket 13 has a back plate 19 and slotted bolt holes 20 for adjustment, and on the back plate are formed saddle bearings 21 to carry the transverse steering rod or bar 22, having stop lugs 22' which bear against the sides of the saddle bearings 21 for holding the bar 22 against lateral movement, as shown in Figure 1. A locking plate 23, over which the tongue 25 of the bracket extends holds the bar 22 in the bearings 21—see Figure 9. The bar 22 has a bearing block 26 formed with a vertical bore to receive the king bolt 27 to hook the hollow tongue 28 to the bar. The plate 23 is attached to the tongue by a pin 29, and the king bolt 27 passes through a slot 30 in the plate. A radius bar 31, having a V-shaped semi-circular track 32 is formed on the ends of the bar 22 and carries the two sections 33 and 34 of a steering cable, the ends of which are attached at 35 to flanges 36. The cable 33 has sections 34 which pass into the tongue and about opposed rollers 37 journalled between ears 38 on the tongue and extend lengthwise of the tongue within the tongue. The tongue has a plate 39 to which pin 29 is attached and the remaining end is attached by a manually-operable bolt 40 in slot 41 and by means of which the cover plate 23 may be withdrawn from under the tongue 25 to permit the bar 22 to be uncoupled from the bearings 21 that are attached to the towing vehicle 2. The free end of the tongue has a transverse bar 42 reinforced by flanges 43 and provided with internally threaded bores 44 in the ends. The tongue has a bar extension 47—see Figures 1 and 7.

Mounted on the transverse bar 8 and longitudinal bars 9 of the trailer is a forward extension having converging side bars 48 which are transversely reinforced as at 49 and have their ends attached to parallel pull bars 50 which are pivotally mounted on bolts 51 threaded in bores 44 of transverse bar 42 of the tongue. Thus, the tongue 28 is hinged at the front through the bar 22 and at the rear through the bolts 51, thereby allowing the towing vehicle 2 and the trailer 7 to move relative to each other, in an up-and-down direction, when travelling. A circular front wheel supporting track ring 54 has an annular outside and depending flange 55, see Figure 12, and is secured by uprights 49 to the bars 48—see Figure 10. Beneath the ring is a circular V-shaped steering cable ring 56 on which is mounted the circular wheel carrying ring 57—see Figures 12 and 14. The wheel carrying ring 57 is smaller than track ring 54 and fits within the flange 55 in spaced relation thereto and carries bearing rollers 58 and 59 which are at right angles to each other and bear against ring 54 and flange 55. Diametrically opposed fingers 54' cooperate with rollers 59 which are journalled in legs 60 extending from parallel wheel frames 61 on which are mounted leaf springs 62, to retain the ring 57 adjacent to the ring 54. The ends of springs 62 are shackled as at 63 and beneath which is shackled as at 64 the bearings 65 of the hub 66 of trailer front wheel 67. The cable 33 goes about the cable ring 56. Cable tubes 68 are provided to guide and support the cable 33 from the tongue 28 to the cable ring.

Mounted on the ring 54 are dash pots or closed end tubes 69 in which are springs 70 about rods 71 which carry the plate 72. These rods are threaded to receive adjusting nuts 73, and the plate 72 carries a rod 74 which has a bifurcated end 75 pivotally connected to tongue member 47 through the bolt 52—see Figure 15—for adjusting the weight to be extended by the trailer on the tongue and on the towing vehicle and to sustain shocks.

As previously explained, the tongue 28 and the pull bars 50 are pivoted together by the pivot bolts 51. The degree of relative movement between tongue 28 and pull bars 50, and thereby the effective weight by the trailer 7 on the towing vehicle 2, can be varied by adjusting the nuts 73. Thus, when it is desired to increase, or "load down," the towing vehicle 2 to obtain an increase in traction for wheels 1, the nuts 73 are screwed down on the rods 71 compressing the springs 76. Compressing the springs 76 increases the resistance to relative movement between the tongue 28 and the pull bars 50, thereby in effect transferring a portion of the weight of trailer 7 to the vehicle 2.

When the vehicle 2 changes its direction of travel, the bar 22 will turn with the vehicle rear axle 4, pivoting about king bolt 27 and drawing with it either section 33 or 34, as the case may be, causing 56—57 to rotate the trailer front wheel 67, as a result of which the trailer follows the vehicle in its change of direction.

From the foregoing it is believed that the operation and advantages of my invention will be apparent, but it is again emphasized that interpretation of its scope should only be conclusive when made in the light of the subjoined claims.

I claim:

1. Means for supporting a trailer front wheel and steering the same from a towing vehicle, comprising a front wheel carrying frame on the trailer, a circular track on the frame, a circular member, a front wheel supported thereby, a circular cable ring attached to the circular wheel support, rollers attached to the circular member and engaging said circular track, a tongue, an adjustable resilient connection means between the wheel carrying frame and said tongue, said tongue being hollow, a hitch support carried by the towing vehicle, a transverse bar connected with the hitch support means pivoting said bar to said tongue, and a steering cable means connecting said bar and said cable ring.

2. Means for supporting a trailer front wheel and steering the same from a towing vehicle, comprising an extension on the trailer chassis for carrying the front wheel, a hollow tongue pivotally connected to the extension, a track ring on the extension, a wheel carrying ring, anti-friction rollers on the wheel carrying ring and engaging the track ring, a wheel supporting frame on the wheel carrying ring, a cable supporting ring on the wheel carrying ring, an adjustable resilient connection means between the track ring and the tongue, a hitch support on the towing vehicle, a transverse bar attached to the hitch support, means pivotally connecting said bar to said tongue, an arcuate cable track attached to said bar, and a steering cable extending about the cable ring, through the tongue, about the arcuate cable track and having its ends connected with the same.

3. The invention as defined in claim 2 wherein the hitch support has a supporting plate shackled to the rear axle housing and the drive shaft casing of the towing vehicle, a bracket mounted on said hitch support, saddle bearings on said bracket on which the transverse bar is pivoted, and a king bolt pivoting said tongue to a medial point of said bar.

4. The invention as defined in claim 2 wherein the arcuate cable track is V-shaped in cross-section and is fixed near its ends to the ends of said transverse bar, and guide rollers rotatably mounted in said tongue for guiding said cable.

5. The invention as defined in claim 2 wherein the track ring has an annular, right angular depending flange, and wherein the rollers are at right angles to each other, respectively, and engage the ring and flange respectively, and wherein the cable ring is V-shaped and fixed to the wheel supporting ring.

6. The invention as defined in claim 2 wherein the adjustable resilient connection means includes a pair of springs, cylinders, rods in the cylinders connected by a plate, and about which rods the springs are mounted, and a rod on the plate connected with the tongue.

7. The invention as defined in claim 2 wherein the cable ring, the wheel supporting ring, and the track ring are supported one above the other respectively, and the wheel is resiliently journalled above all of said rings, and said rings are supported above the trailer frame extension, which extension has converging side rails, and reinforcing means, and wherein the cable has guide tubing from the tongue to the cable ring.

8. In a towing mechanism between a towing vehicle and a trailer, the combination of an extension support secured to said trailer, a cylindrical track attached to said extension support and having a peripheral flange, a cylindrical member rotatable within said track, anti-friction means secured to said cylindrical member and rotatable upon said circular track and flange thereof, retaining means fixed to said cylindrical member and sliding upon said peripheral flange, said retaining means cooperating with said anti-friction means for maintaining said cylindrical member within said circular track, a trailer wheel, spring means supporting the same on said cylindrical member, a cable sheave on said cylindrical member, a hollow draw bar, pull bars attached to said extension support, means pivoting said pull bars to one end of said draw bar for relative oscillatory movement thereabout, a spring mechanism secured to said extension support and pivoted to said draw bar for controlling the degree of oscillatory movement between said draw bar and said pull bars, a transverse bar, means pivoting the same to the other end of said draw bar, a segmental sheave affixed to said bar, cable means trained over said cable sheave and said segmental sheave, means securing the terminal ends of said cable means to said segmental sheave and means detachably securing said transverse bar to the towing vehicle.

FRED C. BURT.

REFERENCES CITED

The following references are of record in the file of this patent:

UNITED STATES PATENTS

| Number | Name | Date |
|---|---|---|
| 1,294,859 | Arato | Feb. 18, 1919 |
| 2,168,147 | Arehart | Aug. 1, 1939 |
| 2,230,567 | Henderson | Feb. 4, 1941 |

FOREIGN PATENTS

| Number | Country | Date |
|---|---|---|
| 164,709 | Switzerland | Dec. 16, 1933 |